(No Model.)

P. J. O'CONNOR.
HOSE AND PIPE COUPLING.

No. 347,368. Patented Aug. 17, 1886.

WITNESSES.
F. E. Monteverde.
Ed. H. Coleman

INVENTOR
Patrick J. O'Connor
by Scrivner & Boone
his Attorneys

UNITED STATES PATENT OFFICE.

PATRICK J. O'CONNOR, OF SAN FRANCISCO, CALIFORNIA.

HOSE AND PIPE COUPLING.

SPECIFICATION forming part of Letters Patent No. 347,368, dated August 17, 1886.

Application filed August 28, 1885. Serial No. 175,593. (No model.)

*To all whom it may concern:*

Be it known that I, PATRICK J. O'CONNOR, a resident of the city and county of San Francisco, in the State of California, have invented an Improved Hose and Pipe Coupling; and I do hereby declare that the following is a full, clear, and exact description thereof.

My invention relates to that class of hose and pipe coupling in which an encircling ring or band is employed to lock and secure the two parts of the coupling together; and it consists in certain details of construction and arrangement, whereby the coupling is greatly simplified and rendered more convenient, safe, and reliable, all as hereinafter specified.

Figure 1:
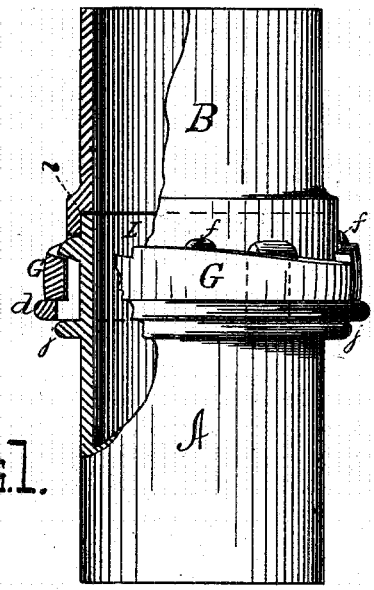
Figure 3:
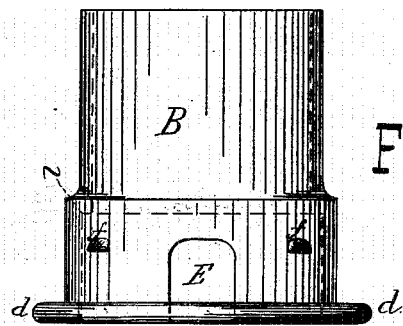
Figure 4:
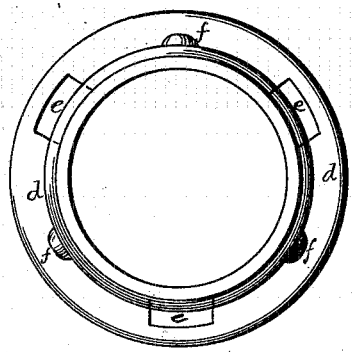
Figure 2:
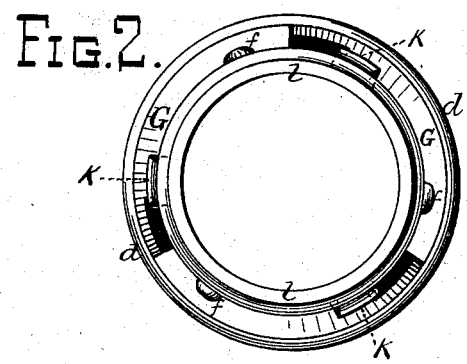
Figure 5:
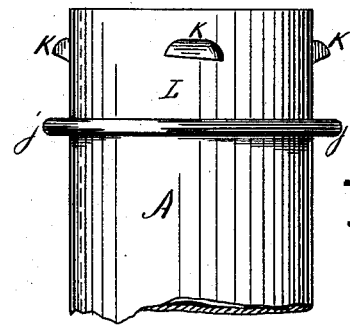
Figure 6:
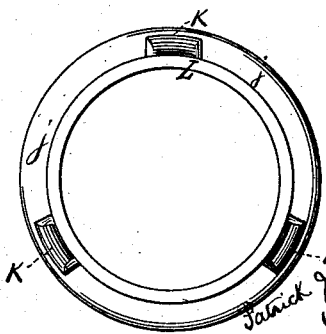

Referring to the drawings which accompany this specification, Figure 1 is an elevation of my improved coupling device, broken away in part to show details. Fig. 2 is a plan view of the same. Fig. 3 is an elevation of the female section of pipe; Fig. 4, a bottom plan view of the same; Fig. 5, an elevation of the male section of the pipe, and Fig. 6 a plan view of the same.

Let A represent the male, and B the female, section of a hose or pipe coupling. At one end of the section B, I make an exterior enlargement, which extends about an inch and a half or two inches (more or less) from its extremity. Around the extreme end of this enlargement I form an outward-projecting rim or bead, *d*. I then bore out the enlarged end of the section, so as to form a chamber inside of the exterior enlargement, which is somewhat larger in diameter than the bore of the section, and this chamber terminates in a square shoulder, *l*, at its inner end. I then make in the end of the enlarged portion of the coupling two or more slots or channels, E, at proper distances apart in its circumference, which extend into and through the end of the section and to about one-half the length of the enlargement. I shall usually employ three of these slots at points equidistant apart. These slots or channels pass entirely through the metal of the enlargement, but only partially through the rim or bead *d*. At two or more points on the exterior of the enlargement, and almost on a line with the inner ends of the slots or channels E, I form or secure a small projection, *f*. I then take a band or ring, G, which is made of the proper size to slip over the enlargement of the section, and make in its inner face as many transverse grooves or channels, *e*, as there are slots E in the end of section B, and at corresponding distances apart, so that when the ring is in place on the enlargement and one of its grooves is brought over one of the slots E the other grooves in the ring will also be opposite or over the other slots in the end of the section. The outer edge or rim of this band or ring I form into as many inclines as there are slots or channels in the end of the section, allowing each incline to commence at one of the grooves *e*. I can then slip this ring over the enlargement of the section by allowing the projection *f* to pass through the grooves *e* in the ring. The ring can then be turned so as to bring its grooves over the slots E of the section. The projections *f* will then serve as keepers to prevent the ring from being slipped off the enlargement or being displaced until it has been turned to a position to allow them to pass through its grooves. The male section of the coupling I make with a reduced extremity, L, which will easily enter the recessed end of section B, and I provide it with a bead or projecting rim, *j*, which will abut against or be near the end of the enlargement of the famale section when its opposite end presses against the square shoulder *l* of the recess, as represented at Fig. 1.

On the reduced end of section A, I form or secure as many lugs, *k*, as there are slots in the end of section B, and at corresponding distances apart. These lugs are high enough to project through the slots and to a short distance above them, but are not too high to pass through the grooves *e* in the ring when the ring is properly set. When the end of section A has been slipped into the recessed end of section B, the lugs *k* will pass into the slots E and through the slots *e* in the ring until they appear on the opposite side of the ring at the foot of the inclines. The ring is then grasped and turned so as to force the lugs up the inclines, thus drawing the sections together and pressing the end of section A against the shoulder *l*, so as to form a close and tight joint. The rim or outer face of the ring G should be milled or roughened, so that it can be grasped with better effect to turn it; or holes could be made in it and a spanner used to give a better leverage. Usually, however, the milling will be sufficient.

This arrangement for a coupling is extremely simple, and the coupling is cheaply constructed. It has no projecting parts to come in contact with objects when the pipe or hose is being moved about, so that there is no danger of its becoming uncoupled by accident. It presents a smooth unobstructed interior, and the joint formed between the end of section A and the shoulder $l$ can be easily packed or can be made tight by grinding.

I am aware that patents have been granted to A. Zoller, May 6, 1884; R. Watkinson, December 4, 1880; J. T. Titus, June 2, 1885, and J. C. Cook, April 18, 1871, which show and describe a pipe-coupling resembling mine in some particulars, and I do not claim the construction covered by these patents; but I am not aware that the specific construction which I have invented has ever before been known.

Having thus described my invention, what I claim, and desire to secure by Letters Patent, is—

A hose and pipe coupling comprising in combination the following elements, viz: the female section B, adapted to have the hose attached at one end and enlarged at the other end, and having within such enlarged portion a shoulder, $l$, and upon the outside of such enlarged portion the retaining-lugs $f$ and rim or bead $d$, and having the slots E, and recesses in the rim corresponding to said slots, the male section A, adapted to have the hose attached at one end and provided with a bead or rim, $j$, and with the lugs $k$ near its opposite end, and the cam-ring G, provided with the internal grooves, $e$, at the base of its inclines, whereby the several parts of the coupling can be detached from each other, and the parts may be securely connected together without perforating the male part of the coupling, substantially as described.

In witness whereof I have hereunto set my hand and seal.

P. J. O'CONNOR. [L. S.]

Witnesses:
  JNO. Z. BOONE,
  W. K. LEVERIDGE.